March 31, 1953 E. LAGELBAUER Re. 23,639

DIREPELLER AND SPEED CONTROL THEREFOR

Original Filed Nov. 29, 1946

INVENTOR.
Ernest Lagelbauer
BY
Munn, Liddy & Glascum
Attorneys

Reissued Mar. 31, 1953

Re. 23,639

UNITED STATES PATENT OFFICE 23,639

DIREPELLER AND SPEED CONTROL THEREFOR

Ernest Lagelbauer, New York, N. Y.

Original No. 2,603,946, dated July 22, 1952, Serial No. 712,797, November 29, 1946. Application for reissue November 18, 1952, Serial No. 321,294

12 Claims. (Cl. 60—35.6)

Matter enclosed in heavy brackets [ ] appears in the original patent but forms no part of this reissue specification; matter printed in italics indicates the additions made by reissue.

This invention relates to an improvement on my pending patent application, Serial No. 467,452 dated November 30, 1942, now abandoned, and entitled "Direct Propulsion Device."

This invention concerns a device that I will refer to as the direpeller and means to control the speed of a rotating member thereof. My device consists of the direpeller with an associated thermal jet unit to effect maintenance of the correct angle of air entrance into the direpeller bladings and utilization of waste heat. The auxiliary thermal jet unit assists in the maintenance of high blading efficiency of the direpeller at all practical flying conditions as well as allowing utilization of waste heat.

Briefly, the direpeller consists of an adjoining stator and rotor co-axially positioned within a direpeller tube. The rotor is driven by a power plant. The direpeller can be defined as a ducted axial turbo-type fan having one rotary and one stationary blading element, the stationary blading element being preferably disposed to the rear of the rotary blading element.

Upon the column of propulsive air passing through the direpeller due to the craft's flight or, during standstill, due to the blower action exerted by the direpeller is imparted an angular, that is, transversal velocity component by virtue of the expended power. The angular acceleration is produced by the action of the rotating stage of the direpeller which is constituted by an appropriately shaped deflection blading. The superposition of this angular flow component upon the longitudinal air flow through the direpeller results in a helical air flow within the direpeller tube.

The thrust developed is due to the rectification or straightening out of the helical air flow by means of a stationary stage of composite deflection blading which receives the thrust and transmits it directly to the aircraft upon which it is rigidly mounted. This reaction results in work performance in the longitudinal direction of flight. The air jet opposite to flight direction produced by the action of the blading, can be referred to as the kinematic jet.

For most efficient operation, the air flow entering both the rotor and stator blading should be nearly co-incident with the direction of the leading edge of the bladings. This condition may be obtained by adjusting the rotational speed of the rotor in accordance with the flying speed.

The rotational speed and consequently the orientation of the helical air flow within the direpeller is adjusted by controlling the power delivered to the direpeller. Of course when the rotational speed of the rotating direpeller member is reduced the thrust of the direpeller is also reduced.

Reduction of the thrust produced by the direpeller due to the reduction of power supplied to it is compensated for to a large extent by the additional thrust produced by the thermal jet unit. Several advantages result from this method of control: First, the regulation of power to the direpeller enhances the efficiency of the kinematic cycle owing to the maintenance of optimum efficiency, not only of the rectifier or stator but also of the impeller or rotor blades. In addition, the employment of the thermal jet unit allows utilization of a considerable amount of waste heat.

Further advantages and unique features of my method will be apparent as I proceed with the description.

Referring to the drawing—

Figure 1:
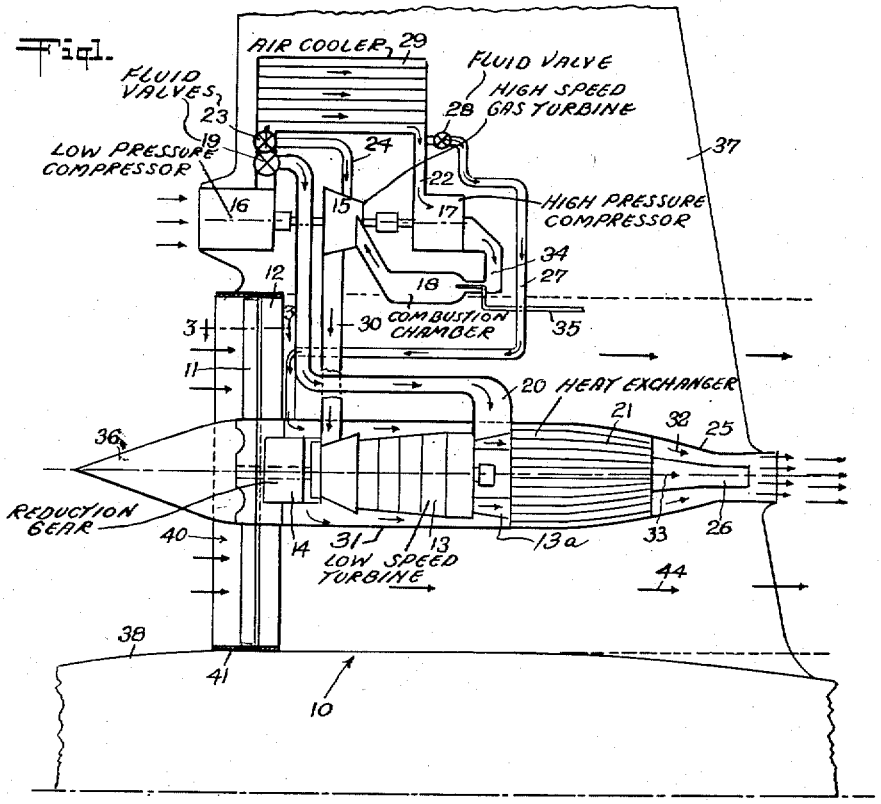
Figure 1 shows a plan view schematically illustrating the installation of a direpeller and the associated thermal jet unit.

In Figure 1, I show a section of aircraft 10 with fuselage 38, showing the physical location of the direpeller and thermal jet unit. The center line of the direpeller 40 is at the level of the wing 37 and the air compression equipment is shown installed in the wing 37. In such an installation there would be a second direpeller located in the corresponding position of the opposite wing. However, in order to properly balance the system for its highest efficiency, the second direpeller would have its rotor rotating in the opposite direction from the first direpeller rotor in order to counterbalance the torque produced by the direpeller action. The direpeller 40 which consists of the rotor 11 and the stator 12 is positioned in the direpeller tube 41. The tube 41 which can best be described as a circular rim of thin metal, is slightly greater in depth than the combined stator and rotor. The rear edge of the stator blading 43 does not extend beyond the rear of the tube 41 while the front portion of the tube 41 extends for a short distance in front of the rotor blading 42.

The rotor 11 is mounted on the shaft which is driven by the low speed gas turbine 13. Mounted on the extreme forward portion of the shaft in front of the rotor 11 is the centroid 36 which revolves with the rotor 11. Positioned on the shaft between the gas turbine 13 and the direpeller 40 is a speed reduction box 14. While this speed reduction box is not absolutely required, it may be installed if needed.

The component parts of the thermal jet unit consist of a high speed gas turbine 15 which is used for driving the turbocompressors 16 and 17. The low pressure turbocompressor 16 takes air directly from the atmosphere after which the bulk of this compressed air is passed through the air cooler 29 to the high pressure turbo compressor 17. A portion of the compressed air delivery of the low pressure compressor 16 is diverted by valve 23 through duct 24 to cool the blades of the high speed gas turbine 15 as shown in my co-pending application, Serial No. 751,164, filed May 29, 1947, *now Patent No. 2,626,502*, and entitled "Cooling System for Gas Turbine Blading." As a result of this action of cooling the blading, the air will absorb a certain amount of heat which is ultimately passed on to the thermal jet for utilization.

The compressed air leaving the high pressure turbo compressor 17 passes through duct 34 to the combustion chamber 18. Here the compressed air is mixed with the fuel supply entering through tube 35 and the resultant combustible mixture furnishes the necessary power to drive the high speed gas turbine 15. The exhaust from turbine 15 being of an intermediate pressure level, is passed through duct 30 to the low speed multi stage gas turbine 13 where its potential energy yields sufficient power to operate the turbine 13.

Valve 19 diverts a portion of the compressed air through duct 20 to the thermal jet. This air is then passed through heat exchanger 21 where it absorbs heat from the turbine exhaust. The exhaust of turbine 13 passes through gas conduits 13a into the heat exchanger 21.

Heat exchanger 21 serves for bringing the thermal jet air to its highest energy content level before it is exhausted through the thermal jet nozzle 25. The gain of this additional energy will result in an increase in the discharged velocity of the thermal jet as it expands from the thermal jet nozzle 25. Before expansion through nozzle 25 the thermal jet air is joined by the air diverted by valve 28 which air has been heated in cooling gas turbine 13, that is, a portion of the air leaving the cooler 29 is diverted by valve 28 through duct 27 to the casing 31 disposed around low speed gas turbine 13 for cooling component parts of this turbine. This air subsequently combines with compressed air diverted from the cooler 29 by valve 19 and is contributed to the thermal jet action.

It can be shown that for horizontal flight and constant fuel expenditure per distance flown, the pitch of the helical air flow in a direpeller does not change materially, irrespective of speed and altitude. However, when an aircraft flies on an inclined path, the pitch changes drastically since the forward speed changes with the degree of inclination while the rotor speed changes in accordance with the power input and with the correspondingly varied mass of propulsive air passing through the direpeller. The net effect is that in climbing, the pitch of the air flow which is the ratio of the forward velocity component to the angular velocity component diminishes, while in descending the opposite holds.

To adapt the power plant for various performance conditions requires considerable flexibility of the power system with respect to load apportionment between the high pressure turbine 15 and the lower pressure turbine 13 as well as to load and speed regulation of the low pressure turbine 13. The means for controlling the performance character of the power system consists in the disposition of compressed air delivered by the compression equipment and involves the regulation of the amount of air extracted from the compressor at an intermediary pressure stage as described above. The principal method for controlling both speed and load of turbine 13 relies on the regulation of the intermediary pressure against which turbine 15 discharges and which is also the admission pressure to turbine 13. In turn, this intermediary pressure is controlled by the amount of air admitted through the secondary air cooling circuit duct 24 of turbine 15. This air actually cools the blades of turbine 15 and enables it to operate with much hotter combustion mixtures without overheating and the thus heated gases passing to and energizing the turbine 13 more effectively drive that turbine and thereby the energy of this heated air is converted to mechanical energy by turbine 13.

For the various conditions of flight it will be necessary to control the apportionment of air delivery to the thermal jet. Under normal takeoff conditions approximately 40% to 80% of the compressed air will be diverted by valve 19 through duct 20 to the thermal jet. When the plane has reached a point where it will level out to horizontal flight, it will be necessary to speed up the rotor 11 to adjust the pitch compensation to the velocity of the incoming air which will be meeting the rotor blades 42 at a different angle than when the plane is in inclined flight. This is accomplished by restricting the air flow to the thermal jet by correspondingly adjusting the valve 19 and also by diverting more air by valve 23 to the high speed turbine 15 which will result in the low speed turbine 13 attaining higher speed. If it is desired to place the plane in a climb, it would be necessary to decrease the speed of the rotor once again which can be accomplished by adjusting valves 19 and 23 to direct more air to the thermal jet and less to the high speed turbine 15.

Figure 2:
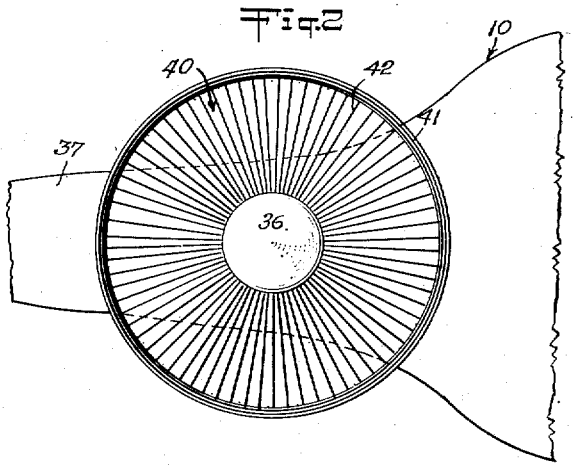
Figure 2 shows a front view of the direpeller.

In Figure 2 I have shown a front view of a direpeller mounted on and in the wing of a plane.

Figure 3:
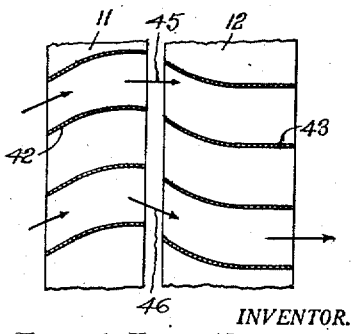
Figure 3 shows a cross sectional view on line 3—3 of Figure 1.

In Figure 3 is an enlarged closeup view of the shape and position of the blading on the stator and rotor of the direpeller with the vectors showing the direction of incoming and outgoing air through the direpeller which propulsive air constitutes the kinematic jet. Vector 45 is the velocity of the air leaving rotor 11, relative to the rotor, while vector 46 represents this same velocity with respect to the aircraft.

Referring to Figure 1, the arrows 44 show the flow of the propulsive air of the kinematic jet. Arrow 32 depicts the thermal jet and arrow 33 depicts the exhaust from the gas turbine. It is also indicated that the thermal jet and exhaust from the gas turbine will be directed through expansion nozzles 25 and 26, respectively, in such a manner that they will add to the propulsive thrust of the kinematic jet in driving the aircraft.

While the invention has been described in detail with respect to a present preferred form which which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

I claim:

1. A propulsion device for aircraft comprising a direpeller and an auxiliary thermal jet unit, said direpeller including adjacent rotating and stationary bladed members, a power plant connected to and driving said direpeller, *said auxiliary thermal jet unit including* an air compressor [,] *and* a power plant connected to and driving said air compressor, the exhaust of said second power plant being passed to and driving the first power plant, means for supplying compressed air directly from the compressor to the thermal jet unit and means for supplying compressed air from said compressor to the power plant driving the compressor, and means for selectively varying the ratio of the compressed air thus distributed.

2. A propulsion device for aircraft comprising a direpeller and an auxiliary thermal jet unit including an exhaust gas and compressed air nozzle for adjustment of the orientation of the helical air flow within said direpeller, said direpeller including an adjoining rotating and a stationary member equipped with blading, said rotating member creating said helical air flow by imparting an angular velocity component upon the longitudinal air flow, said stationary member rectifying said air flow to effect and receive a forward thrust, said thermal jet unit including an air compressor and a power plant driving the same, a power plant for driving the direpeller, said second power plant receiving the exhaust from the first power plant, means for passing compressed air through said power plants to one of said nozzles and means for passing compressed air directly to the other of said nozzles, and means for apportioning relative amounts of air thus passed.

3. A propulsion device of the character set forth in claim 1, further characterized in that the direpeller comprises adjacent rotating and stationary bladed members, said rotating member creating a helical air flow which is subsequently rectified by the stationary member to create a forward thrust.

4. A propulsion device of the type set forth in claim 3, further characterized by the fact that the direpeller includes a tube within which the adjacent rotating and stationary members are mounted, said tube being opened at both ends.

5. A propulsion device which includes a direpeller and an auxiliary thermal jet unit including exhaust and compressed air nozzles, said direpeller including adjacent rotating and stationary bladed members mounted coaxially within an open-ended tube, a low pressure turbine for driving the direpeller, an air compressor, a high pressure turbine driving said compressor, the low pressure turbine being driven by the exhaust gases from the high pressure turbine, and means for apportioning the compressed air between the turbines on the one hand and the compressed air nozzle on the other, the exhaust gas from the low pressure turbine being passed to the exhaust gas nozzle.

6. A propulsion device for aircraft including a direpeller and an auxiliary thermal jet unit for adjustment of the pitch of the air flow within said direpeller, said direpeller consisting of adjacent rotating and stationary bladed members coaxially mounted within an open-ended tube, a power plant for driving said rotating member to create a helical flow for imparting an angular velocity component upon the longitudinal air flow, said stationary member rectifying said helical air flow to effect and receive a forward thrust, an air compressor and a power plant to drive it, means for passing compressed air in selected amounts from the compressor directly to the thermal jet unit, a heat exchanger disposed between the thermal jet unit and the first mentioned power plant, said heat exchanger adapted to receive the air passing to the thermal jet unit directly from the compressor, and means for passing selected amounts of compressed air from the compressor through said power plants and said heat exchanger to the thermal jet unit.

7. A propulsion device for aircraft comprising a direpeller and an auxiliary thermal jet unit for the adjustment of the orientation of the helical air flow within said direpeller, said direpeller comprising adjacent rotating and stationary bladed members, said rotating member creating a helical air flow for imparting an angular velocity component to the longitudinal air flow entering the direpeller, said stationary member rectifying said helical air flow into a forward thrust, said thermal jet unit including an air compressor and a power plant to drive the same, a power plant connected to and driving the direpeller, the exhaust of the first power plant passing through and driving the second power plant, a pair of concentric nozzles forming part of the thermal jet unit, one of said nozzles adapted to receive gas from said power plants and the other compressed air from said compressor, means for passing selected amounts of compressed air through the power plants to one of said nozzles and means for passing selected amounts of compressed air directly from the compressor to the other nozzle.

8. A propulsion device of the type set forth in claim 7, further characterized by the fact that a heat exchanger is disposed to receive the exhaust gases from the power plants before they reach a nozzle and to transfer heat from said gases to the compressed air which passes directly from the compressor to the other nozzle.

9. A propulsion device of the type set forth in claim 7, further characterized by the fact that the nozzles are expansion nozzles for expanding and discharging the heated exhaust gases and heated compressed air towards the rear of the craft, the resulting thrust combining with the thrust of said direpeller to propel the aircraft.

*10. A propulsion device for aircraft comprising kinematic propelling means and an auxiliary thermal jet unit, a power plant connected to and driving said propelling means, said auxiliary thermal jet unit including an air compressor and a second power plant connected to and driving said air compressor, the exhaust of said second power plant being passed to and driving the first power plant, both said power plants being independently shafted, means for supplying compressed air directly from the compressor to the thermal jet unit, means for supplying compressed air from said compressor to the second power plant, and means for selectively varying the ratio of the compressed air thus distributed.*

*11. A propulsion device which includes a kinematic propelling means and an auxiliary thermal jet unit including gas exhaust and compressed air nozzles, a low pressure turbine for driving the propelling means, an air compressor, a high pressure turbine driving said compressor, both said turbines being independently shafted, the low pressure turbine being driven by the exhaust gases*

*from the high pressure turbine, and means for apportioning the compressed air between the turbines on the one hand and the compressed air nozzle on the other, the exhaust gas from the low pressure turbine being passed to the exhaust gas nozzle.*

*12. A propulsion device for aircraft comprising a kinematic propelling means and an auxiliary thermal jet unit, said thermal jet unit including an air compressor and a power plant to drive the same, a power plant connected to and driving the propelling means, the exhaust of the first power plant passing through and driving the second power plant, a pair of concentric nozzles forming part of the thermal jet unit, one of said nozzles adapted to receive gas from said power plants and the other compressed air from said compressor,*

*means for passing selected amounts of compressed air through the power plants to one of said nozzles and means for passing selected amounts of compressed air directly from the compressor to the other nozzle.*

ERNEST LAGELBAUER.

REFERENCES CITED

The following references are of record in the file of this patent or the original patent:

UNITED STATES PATENTS

| Number | Name | Date |
|---|---|---|
| Re. 23,198 | Anxionnaz et al. | Feb. 21, 1950 |
| 2,385,366 | Lysholm | Sept. 25, 1945 |
| 2,464,724 | Sédille | Mar. 15, 1949 |